United States Patent
Purdy

(10) Patent No.: US 11,689,004 B2
(45) Date of Patent: *Jun. 27, 2023

(54) DEEP FIBER PUSH CONNECTOR THAT ALLOWS FOR ROTATION DURING TIGHTENING WITHOUT DAMAGING CABLE

(71) Applicant: PPC BROADBAND, INC., East Syracuse, NY (US)

(72) Inventor: Eric J. Purdy, Constantia, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/447,054

(22) Filed: Sep. 7, 2021

(65) Prior Publication Data

US 2021/0399535 A1    Dec. 23, 2021

Related U.S. Application Data

(63) Continuation of application No. 16/860,972, filed on Apr. 28, 2020, now Pat. No. 11,114,827, which is a
(Continued)

(51) Int. Cl.
*H02G 3/04* (2006.01)
*G02B 6/255* (2006.01)

(52) U.S. Cl.
CPC ......... *H02G 3/0462* (2013.01); *G02B 6/2558* (2013.01)

(58) Field of Classification Search
CPC ............................ H02G 3/0462; G02B 6/2558
See application file for complete search history.

(56) References Cited

U.S. PATENT DOCUMENTS 3,778,535 A    12/1973 Forney, Jr.
3,824,686 A    7/1974 Forney, Jr.
(Continued)

OTHER PUBLICATIONS

Hebbard, "A New Fiber Deployment Technique for Brownfield Conversions," Broadband Properties, Aug./Sep. 2010, 5 pages [retrieved on Jan. 20, 2021], retrieved from the internet: <URL:bbpmag.com/2010mags/aug-sep10/BBP_Aug2010_BrownfieldConversions.pdf>.
(Continued)

*Primary Examiner* — Sherman Ng
(74) *Attorney, Agent, or Firm* — MH2 Technology Law Group LLP

(57) ABSTRACT

A connector includes a first connector body and a second connector body configured to be coupled to one another. The first connector body has a through hole and a cavity. The through hole and the cavity are configured to receive a shield of a hardline coaxial cable. A first washer is disposed in the first connector body and is configured to permit the shield to be pushed in a first direction through the through hole and into the cavity while resisting movement of the shield in a second direction opposite to the first direction. The second connector body has a through hole and a cavity. The through hole and the cavity of the second connector body are configured to receive a tubular member. A second washer is disposed in the second connector body and is configured to permit the tubular member to be pushed in the second direction through the through hole of the second connector body and into the cavity of the second connector body while resisting movement of the tubular member in the first direction. The second connector body is rotatable relative to the second washer and the tubular member until the second connector body and the first connector body are coupled together to a predetermined degree of tightness.

23 Claims, 5 Drawing Sheets

Related U.S. Application Data continuation of application No. 16/581,631, filed on Sep. 24, 2019, now Pat. No. 10,637,219, which is a continuation of application No. 15/387,641, filed on Dec. 21, 2016, now Pat. No. 10,422,955.

(60) Provisional application No. 62/387,052, filed on Dec. 21, 2015.

(56) References Cited

U.S. PATENT DOCUMENTS

| | | | |
|---|---|---|---|
| 4,583,811 A | 4/1986 | McMills | |
| 5,364,281 A | 11/1994 | Leto | |
| 6,634,906 B1 | 10/2003 | Yeh | |
| 6,824,172 B1* | 11/2004 | Komolrochanaporn | F16L 37/0925 285/105 |
| 7,942,695 B1 | 5/2011 | Lu | |
| 8,007,284 B2 | 8/2011 | Smith | |
| 2003/0224657 A1* | 12/2003 | Malloy | H01R 9/0521 439/578 |
| 2005/0085125 A1 | 4/2005 | Montena | |
| 2010/0255721 A1 | 10/2010 | Purdy et al. | |
| 2011/0308855 A1 | 12/2011 | Marsh et al. | |
| 2012/0174374 A1* | 7/2012 | Crompton | F16L 37/0915 285/308 |
| 2013/0168959 A1* | 7/2013 | Turk | F16L 19/065 285/342 |
| 2015/0152986 A1* | 6/2015 | Taylor | F16L 37/091 285/332.2 |
| 2015/0222050 A1* | 8/2015 | Behning | H01R 13/6456 439/314 |

OTHER PUBLICATIONS

Search Report dated Mar. 16, 2017 in corresponding International Application No. PCT/US16/68156, 3 pages.
Written Opinion dated Mar. 16, 2017 in corresponding International Application No. PCT/US16/68156, 4 pages.
International Preliminary Report on Patentability dated Jun. 26, 2018 in corresponding International Application No. PCT/US16/68156, 5 pages.

* cited by examiner

DEEP FIBER PUSH CONNECTOR THAT ALLOWS FOR ROTATION DURING TIGHTENING WITHOUT DAMAGING CABLE

CROSS-REFERENCE TO RELATED APPLICATIONS

This application is a Continuation of U.S. application Ser. No. 16/860,972, filed Apr. 28, 2020, pending, which is a Continuation of U.S. application Ser. No. 16/581,631, filed Sep. 24, 2019, now U.S. Pat. No. 10,637,219, which is a Continuation of U.S. application Ser. No. 15/387,641, filed Dec. 21, 2016, now U.S. Pat. No. 10,422,955, which claims the benefit of U.S. Provisional Application No. 62/387,052, filed Dec. 21, 2015, the disclosures of which are incorporated herein by reference Also, this application is related to U.S. application Ser. No. 15/296,026, filed Oct. 17, 2016 and U.S. Provisional Application No. 62/242,987, filed Oct. 16, 2015, the disclosures of which are incorporated herein by reference.

BACKGROUND

Consumer requests for Video on Demand, high definition content, and DOCSIS® 3.0 data services is consuming ever-increasing amounts of network capacity. Also, the pursuit of "green" business practices has become desirable. Cable operators are able to increase network bandwidth significantly, while simultaneously lowering energy consumption and improving operational efficiency, by driving fiber deeper into the network and reducing the number of homes served per node, for example, from 500 to 2,000 homes in a traditional hybrid fiber coax (HFC) architecture to typically around 100 homes.

By pushing fiber deeper into the network, typically within a few hundred feet of the subscribers' homes, the optical-to-electrical conversion of downstream signals occurs much closer to subscribers' homes, which eliminates the need for RF amplifiers in the coax plant, thereby achieving significant green benefits. With the length of the coaxial cable runs shortened, that portion of the network becomes entirely passive. As this reduces the size of node service areas, it in turn results in an increase of the narrowcast bandwidth available to individual subscribers.

Conventional construction methods for installing fiber optic micro cable deeper into the network require digging, trenching, boring, and restoration. Such methods impact customer landscaping, lawns, and other utilities including water, power, and gas lines.

More recently, alternative fiber deployment techniques have been developed whereby cable operator coaxial cables are converted to fiber-optic cables, which allows the operator to deploy fiber deeper in the network. These techniques remove the dielectric and center conductor of a hardline coax cable, while leaving the aluminum shield of the hardline coax in place for use as a conduit or micro-duct for installing fiber optic micro cable. These alternative deployment techniques are at substantially lower cost than traditional boring and trenching and take a fraction of the time. By avoiding digging, trenching, boring, and restoration, impacts to customer landscaping, lawns, and other utilities including water, power, and gas lines are avoided.

These alternative techniques typically involve attaching a hydraulic fitting to an end of an existing coax cable and injecting a biodegradable soap solution into the coax under pressure. This fluid compresses the foam core, breaking it from the shield, and pushes it out the far end. The remaining aluminum shield of the hardline coax is cleaned and then used as a conduit or micro-duct for installing fiber optic micro cable. These techniques are referred to as high pressure coax core ejection and fiber optic cable injection ("coax ejection and fiber injection techniques").

In order to create longer continuous lengths of hollowed-out hardline coax cables, separate spans of coax cables that terminate at a splice point can be connected by airtight fittings. The coax ejection and fiber injection techniques conventionally require a special connector to be attached to the end of the coax cable to accommodate the hydraulic fitting used in the core ejection process and another special connector to facilitate injection of the fiber optic cable. Still another connector is required for connecting the hollowed-out hardline coax cable with a second hollowed-out hardline coax cable.

It may be desirable to provide a connector for use in coax ejection and fiber injection techniques that can accommodate the hydraulic fitting, facilitate injection of the fiber optic cable, and connect two hollowed-out aluminum shields of coaxial cables In some aspects, it may be necessary to splice together two same cables, for example, two aluminum hardline cables. In such case, it may be important to have one side of the connector spin while both cables are assembled with both ends of the connector, for example, to avoid damage to one of the hardline cables that may be caused by frictional contact during spinning of the connector while making the splice.

Thus, it may be desirable to provide a connector for use in a splice connection that permits one connector body to spin relative to a cable inserted therein while coupling the connector body to another connector body.

SUMMARY

According to various aspects of the disclosure, a connector includes a first connector body and a second connector body configured to be coupled to one another. The first connector body has a through hole and a cavity. The through hole and the cavity are configured to receive an aluminum shield of a hardline coaxial cable. A first washer is disposed in the first connector body and is configured to permit the aluminum shield to be pushed in a first direction through the through hole and into the cavity while resisting movement of the aluminum shield in a second direction opposite to the first direction. The second connector body has a through hole and a cavity. The through hole and the cavity of the second connector body are configured to receive a tubular member. A second washer is disposed in the second connector body and is configured to permit the tubular member to be pushed in the second direction through the through hole of the second connector body and into the cavity of the second connector body while resisting movement of the tubular member in the first direction. The second connector body is rotatable relative to the second washer and the tubular member until the second connector body and the first connector body are coupled together to a predetermined degree of tightness.

In accordance with some aspects of the disclosure, a method of coupling a tubular member to an aluminum shield of a hardline coaxial cable includes installing a first connector body on the aluminum shield, pushing the aluminum shield through a first washer disposed in the first connector body, pushing a tubular member through a through hole, a cavity, and a second washer disposed in a second connector body, and coupling a second connector body to the first connector body. The first connector body has a through hole and a cavity, and the through hole and the cavity are configured to receive the aluminum shield. The first washer is configured to permit the aluminum shield to be pushed in a first direction through the through hole and into the cavity while resisting movement of the aluminum shield in a second direction opposite to the first direction. The second washer is configured to permit the tubular member to be pushed in the second direction through the through hole of the second connector body and into the cavity of the second connector body while resisting movement of the tubular member in the first direction. The second connector body is rotatable relative to the second washer and the tubular member during the coupling step until the second connector body and the first connector body are coupled together to a predetermined degree of tightness.

DETAILED DESCRIPTION OF THE EMBODIMENTS

Figure 1:
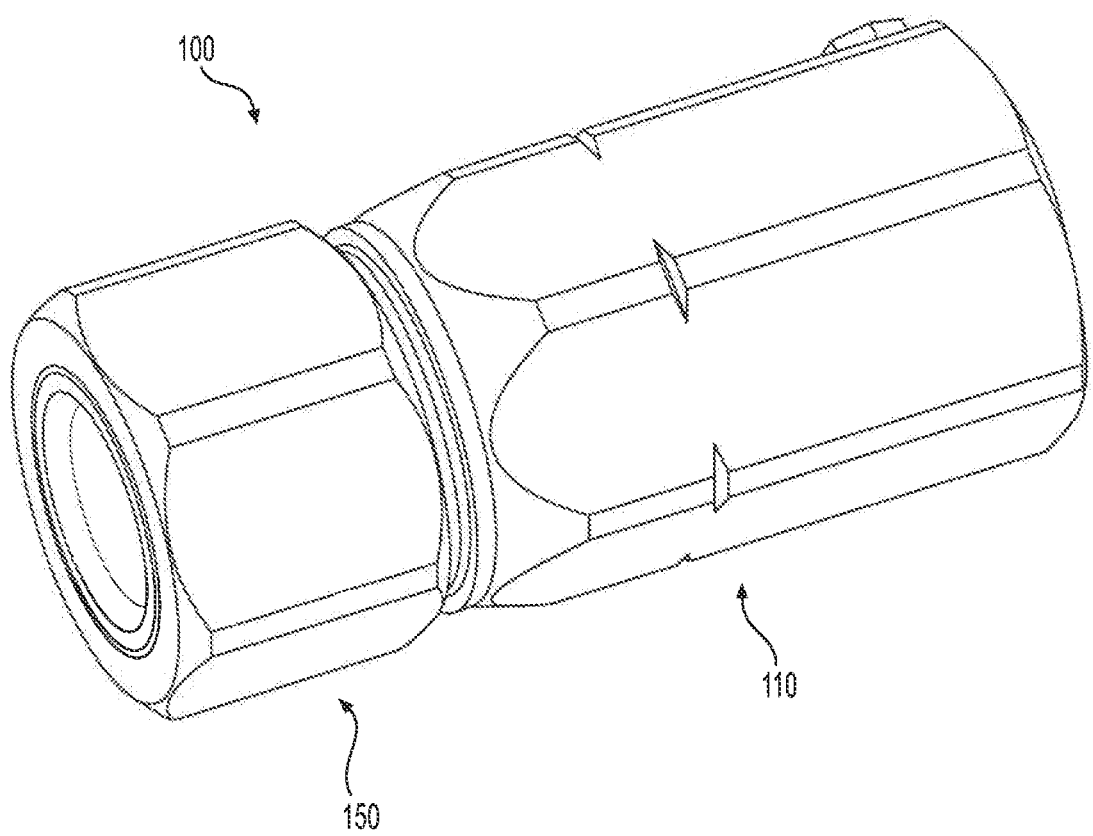
FIG. 1 is a perspective view of an exemplary connector in accordance with various aspects of the disclosure.

FIGS. 1-7 illustrate an exemplary connector 100 in accordance with various aspects of the disclosure. The connector 100 includes a first connector portion 110 and a second connector portion 150 that are couplable to one another.

As shown in FIGS. 1-7, the first connector portion 110 includes a first connector body 112, a first seal 114, a first ring member 116, a first washer 118, and a second ring member 120. The first connector body 112 includes a first end wall 122 having a through hole 124 sized and configured to receive an aluminum shield 190 (FIGS. 6 and 7) of a hardline coax cable. A second end 126 of the first connector body 112, opposite to the first end wall 122, includes a female threaded portion 128. The first connector body 112 includes a cavity 130 between the first end wall 122 and the female threaded portion 128.

Figure 2:
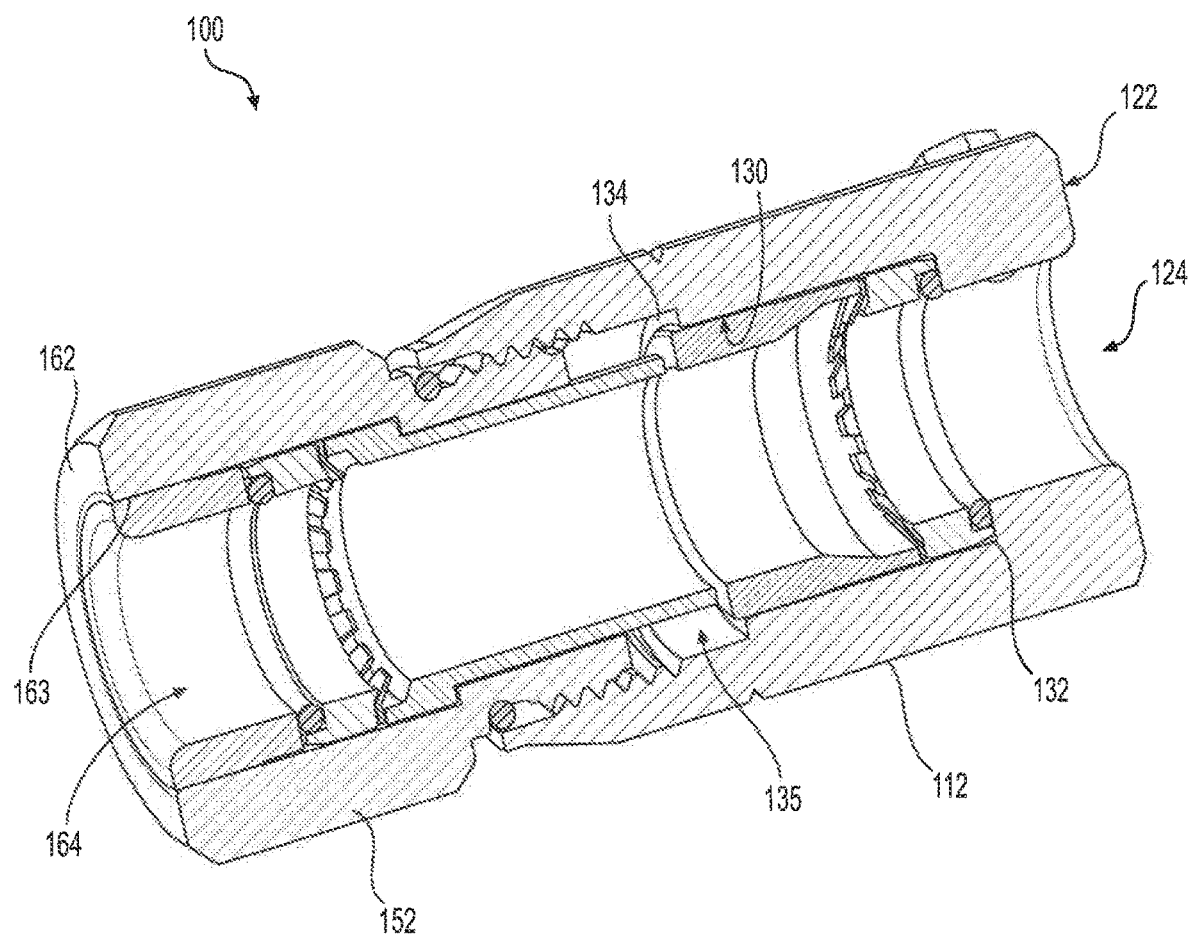
FIG. 2 is a cross-sectional view of the exemplary connector of FIG. 1 in an uninstalled state.

The cavity 130 is configured to receive the first seal 114, the first ring member 116, the first washer 118, and the second ring member 120. An inner peripheral wall 115 of the first connector body 112 defines a first shoulder 132 spaced from the first end wall 122 and facing in a direction toward the female threaded portion 128. The first shoulder 132 seats the first seal 114 and the first ring member 116. As best shown in FIG. 2, the first ring member 116 sandwiches the first seal 114 against the first shoulder 132. The first washer 118 is sandwiched between the first and second ring members 116, 120 along a longitudinal dimension of the first connector body 112.

According to various aspects, the first connector body 112 may be constructed from aluminum and have a chromate conversion coatings such as, for example, yellow iridite. The first and second ring members 116, 120 may be constructed from brass and may be nickel-plated. The first and second ring members 116, 120 can thus be press-fit into the cavity 130 of the first connector body 112 such that the first and second ring members 116, 120 are held by an interference fit relationship with the inner peripheral wall 115 of the first connector body 112. The first and second ring members 116, 120 are assembled with the connector body 112 such that the first washer 118 is held firmly in place along the longitudinal dimension to maintain electrical continuity through the first and second ring members 116, 120 and the first washer 118. The first washer 118 is also substantially centered relative to the cavity 130 and the through hole 124.

Referring to FIG. 2, the first connector body 112 includes a second shoulder 134 at an end of the cavity 130 opposite to the first shoulder 132. The second shoulder 134 is spaced from the female threaded portion 128 in the longitudinal dimension of the first connector body 112. The second ring member 120 may extend from the cavity 130 beyond the second shoulder 134, but a gap 135 is maintained between the female threaded portion 128 and the second ring member 120, as will be discussed below.

Figure 4:
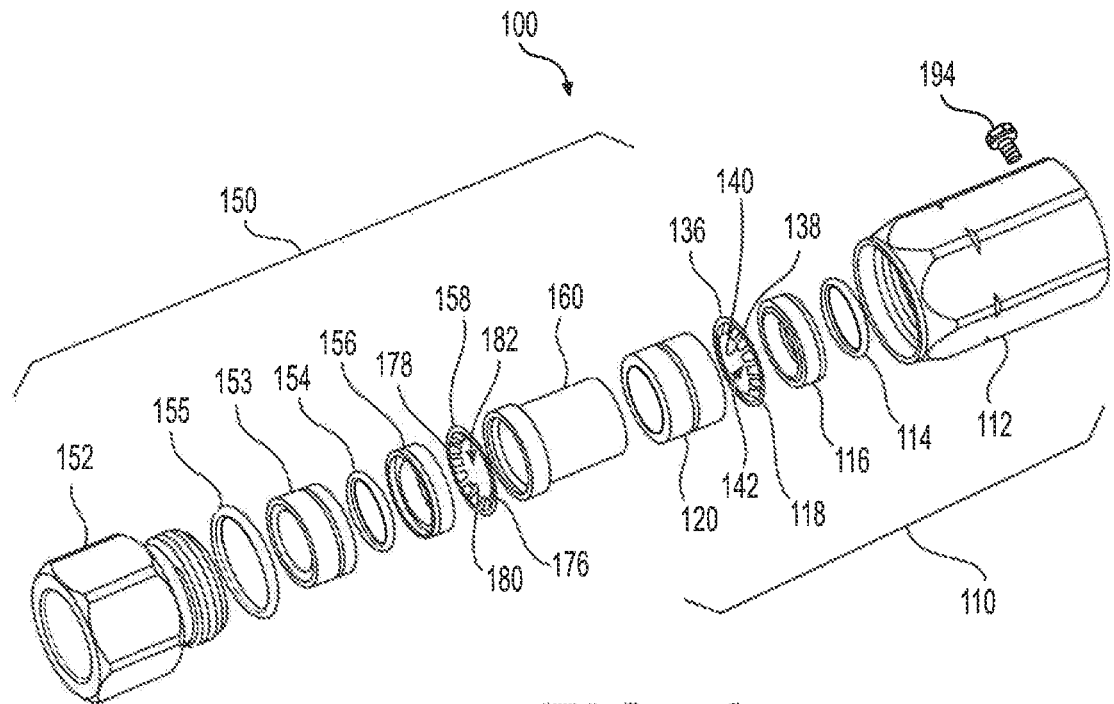
FIG. 4 is an exploded view of the exemplary connector of FIG. 1.

Referring to FIG. 4, the first washer 118 may be a stainless steel stamping comprising an annular portion 136 with a plurality of inward-facing fingers 138. The fingers 138 extend from the annular portion 136 at an angle away from the first end wall 122 and toward the second end 126 of the first connector body 112. The radially inward-most tips 140 of the fingers 138 define an opening 142 sized and configured to be slightly smaller than an outer diameter of the aluminum shield 190 of a hardline coax cable. When the aluminum shield 190 is pushed through the opening 142 of the first washer 118, the fingers 138 can bend in the longitudinal dimension toward the second end 126 of the first connector body 112 to accommodate the slightly larger aluminum shield 190. Once the first connector body 112 is assembled on the aluminum shield 190, the resiliency of the fingers 138 urges the fingers 138 radially inward toward the aluminum shield 190 to provide a gripping force against the aluminum shield 190. The gripping force of the fingers 138 together with the angled orientation of the fingers 138 helps to prevent the first connector body 112 from being removed from the aluminum shield 190 and from being pushed further through the cavity 130.

Figure 5:
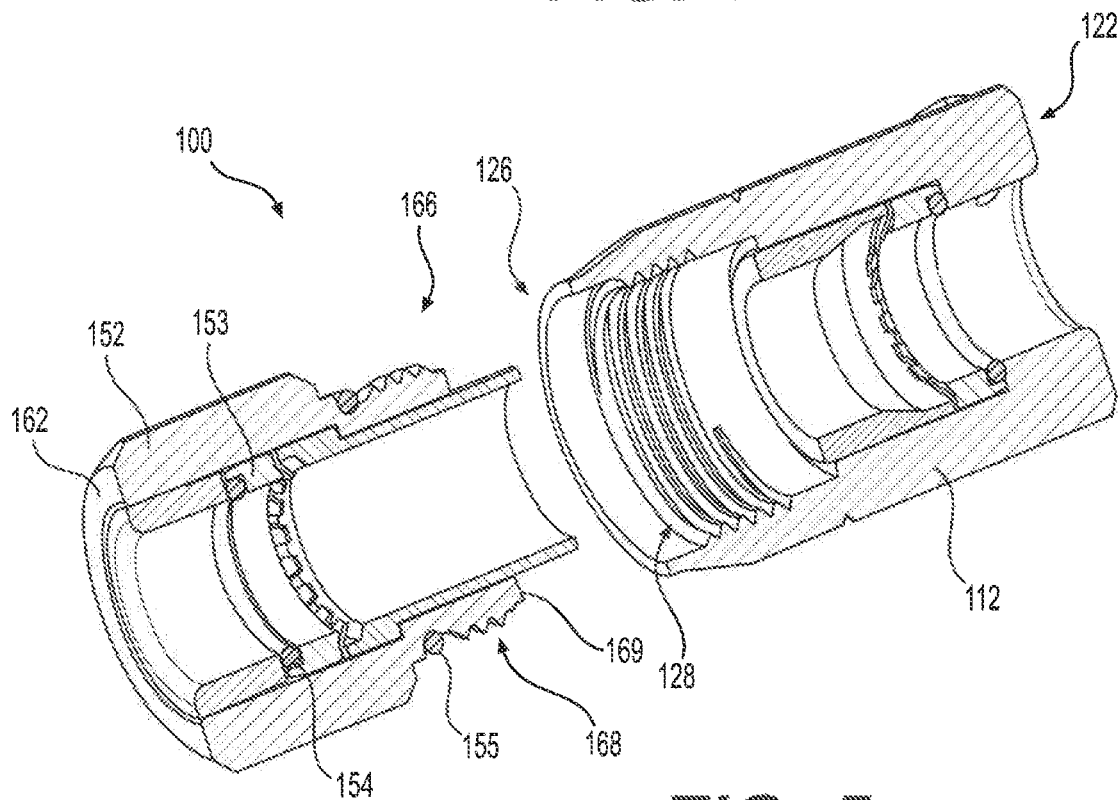
FIG. 5 is an alternative cross-sectional view of the exemplary connector of FIG. 1 in an uninstalled state.

The second connector portion 150 includes a second connector body 152, a third ring member 153, a second seal 154, a third seal 155, a fourth ring member 156, a second washer 158, and a pusher 160. The second connector body 152 includes a first end wall 162 and an inner surface 163. The third ring member 153 has an outer dimension sized such that the third ring member 153 can be press fit into the second connector body 152 adjacent the first end wall 162 such that the third ring member 153 is held by an interference fit relationship with the inner surface 163 of the second connector body 152. The third ring member 153 has a through hole 164 sized and configured to receive a tubular member 192 such as, for example, an aluminum shield of a hardline coax cable. Referring to FIG. 5, a second end 166 of the second connector body 152, opposite to the first end wall 162, includes a male threaded portion 168. The third seal 155 surrounds the second connector body 152 between the male threaded portion 168 and a shoulder 157 at an end of the head 159 of the second connector body 152 that is opposite to the first end wall 162.

Figure 3:
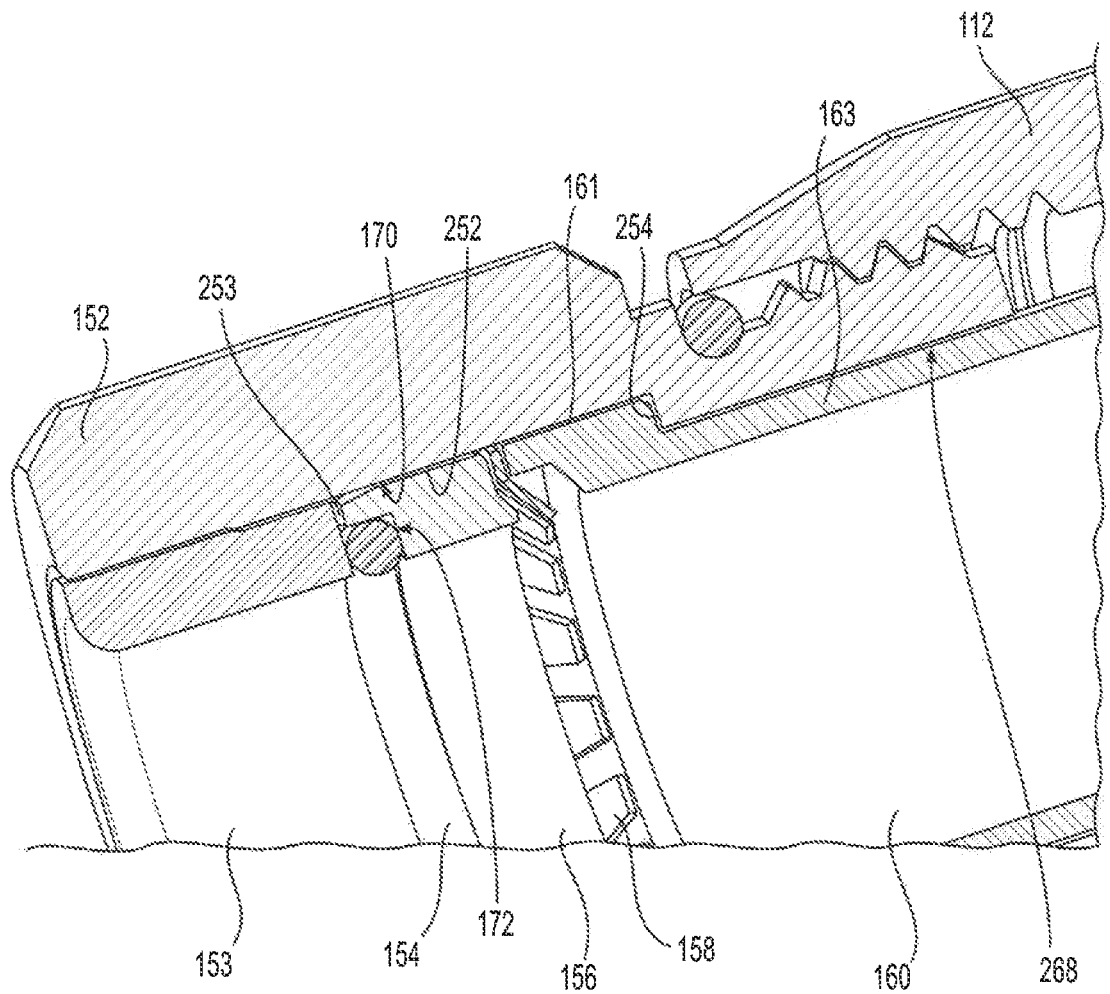
FIG. 3 is a magnified view of a portion of the cross-sectional view of FIG. 2.

Referring now to FIG. 3, the second connector body 152 includes a cavity 170 defined by an axially-facing end surface 253 of the third ring member 153, a radially-inward facing surface 252 of the second connector body 152, and an axially-facing shoulder 254 of the second connector body 152. The axially-facing end surface 253 faces a direction away from the first end wall 162 and the axially-facing shoulder 254 faces the first end wall 162, such that the axially-facing end surface 253 and the axially-facing shoulder 254 face one another. The cavity 170 is configured to receive the second seal 154, the fourth ring member 156, the second washer 158, and a head portion 161 of the pusher 160. The head portion 161 has a larger outside diameter than a body portion 165 of the pusher 160 so that the head portion 161 is maintained in the cavity, while the body portion 165 extends through an interior of the male threaded portion 168 and extends beyond a second end wall 169 (FIG. 5) of the second connector body 152, which is at the end opposite to the first end wall 162. The body portion 165 has an outer peripheral surface spaced from an inner surface 268 of the male threaded portion to avoid an interference fit, such that second connector body 152 can be rotated independently of and relative to the body portion 165.

The second seal 154 is disposed between the axially-facing end surface 253 of the third ring member 153 and a notch 172 cut out of the inner peripheral surface of the fourth ring member 156 at an end of the fourth ring member 156 that faces the third ring member 153. As best shown in FIG. 3, the second washer 158 is disposed between the fourth ring member 156 and the head portion 161 of the pusher 160.

When the second connector body 152 is in an unassembled, pre-installed state (i.e., before the tubular member 192 is inserted into the second connector body 152) and an assembled, partially-installed state (i.e., when the tubular member 192 is inserted into the second connector body 152, but before the second connector body 152 is tightened to the first connector body 112 to a predetermined degree of tightness, for example, fully tightened), the fourth ring member 156, the second washer 158, and the head portion 161 of the pusher 160 are disposed in the cavity 170 in a floating, non-fixed manner. That is, outer peripheral surfaces of the fourth ring member 156, the second washer 158, and the head portion 161 are spaced from the radially-inward facing surface 252 of the second connector body 152 to avoid an interference fit, such that second connector body 152 can be rotated independently of and relative to the fourth ring member 156, the second washer 158, and the head portion 161. Also, the adjacent radial surfaces of (1) the third ring member 153 and fourth ring member 156, (2) the fourth ring member 156 and the second washer 158, (3) the second washer 158 and the head portion 161 of the pusher 160, and (4) the head portion 161 of the pusher 160 and the axially-facing shoulder 254 of the second connector body 152 are spaced from one another to avoid a press fit in the axial direction, such that second connector body 152 can be rotated independently of and relative to the fourth ring member 156, the second washer 158, and the head portion 161 in the unassembled, pre-installed state and the assembled, partially-installed state. Additionally, the fourth ring member 156, the second washer 158, and the head portion 161 are rotatable independently of one another in the unassembled, pre-installed state and the assembled, partially-installed state.

According to various aspects, the second connector body 112 may be constructed from aluminum and have a chromate conversion coating such as, for example, yellow iridite. The third and fourth ring members 156, 156 and the pusher 160 may be constructed from brass and may be nickel-plated.

Referring to again to FIG. 4, the second washer 158 may be a stainless steel stamping comprising an annular portion 176 with a plurality of inward-facing fingers 178. The fingers 178 extend from the annular portion 176 at an angle away from the first end wall 162 and toward the second end 166 of the second connector body 152. The radially inward-most tips 180 of the fingers 138 define an opening 182 sized and configured to be slightly smaller than an outer diameter of the tubular member 192. When the tubular member 192 is pushed through the opening 182 of the second washer 158, the fingers 178 can bend in the longitudinal dimension toward the second end 166 of the second connector body 152 to accommodate the slightly tubular member 192. Once the first connector body 112 is assembled on the tubular member 192, the resiliency of the fingers 178 urges the fingers 178 radially inward toward the tubular member 192 to provide a gripping force against the tubular member 192. The gripping force of the fingers 178 together with the angled orientation of the fingers 178 helps to prevent the first connector body 112 from being removed from the tubular member 192, while permitting the tubular member 192 to be inserted into and/or through the second connector body 152.

In use, for example, at a splice location of two runs of hardline coaxial cable, the connector 100 may be utilized during a process for removing the core (i.e., the center conductor and dielectric) from inside of one hardline coaxial cable to create an open conduit. The connector 100 is then also utilized to facilitate injection of fiber optic cable into the conduit and to splice the one hollowed-out hardline coaxial cable to a second hollowed-out hardline coaxial cable.

For example, the first connector body 112 may be assembled on a one end of a first run of hardline coax cable by pushing the aluminum shield 190 through the through hole 124. The second shoulder 134 and/or the second ring member 120 can serve as an installation guide that indicates how far to push the connector onto the aluminum shield 190. A hydraulic fitting (not shown) may be coupled to the first connector body 112 to facilitate the ejection of the center conductor and dielectric. Once the center conductor and dielectric are ejected from the hardline cable, only the aluminum shield 190 remains. The hydraulic fitting may then be removed from the first connector body 112.

Figure 6:
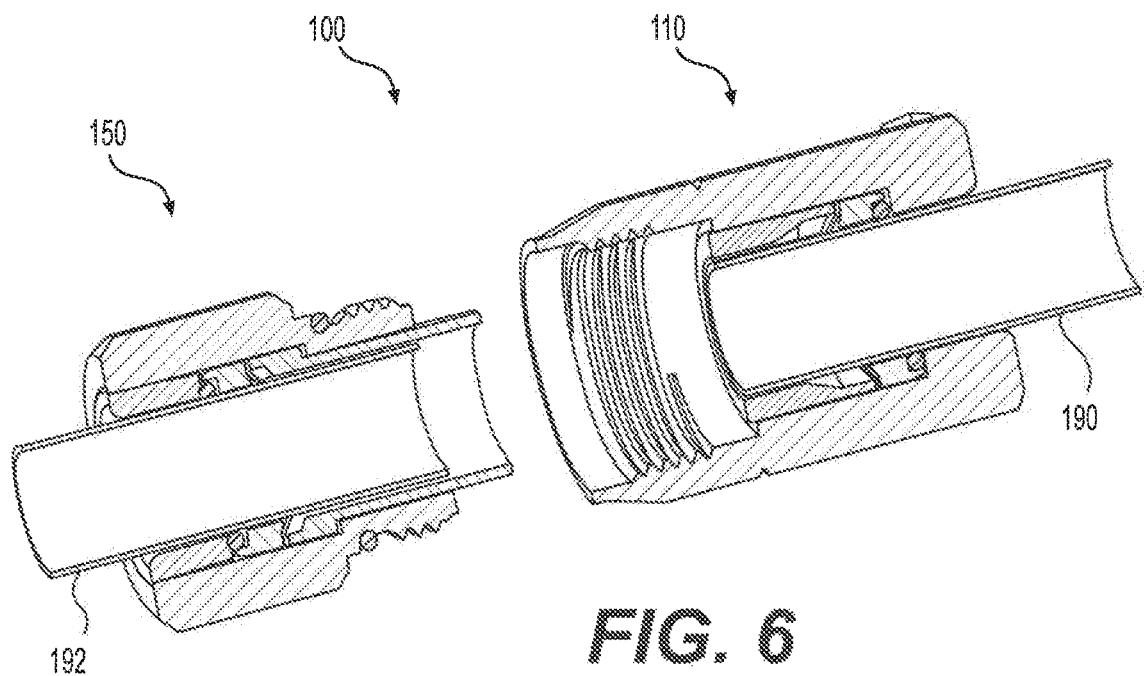
FIG. 6 is a perspective view of the exemplary connector of FIG. 1 in an assembled and partially-installed state.
Figure 7:
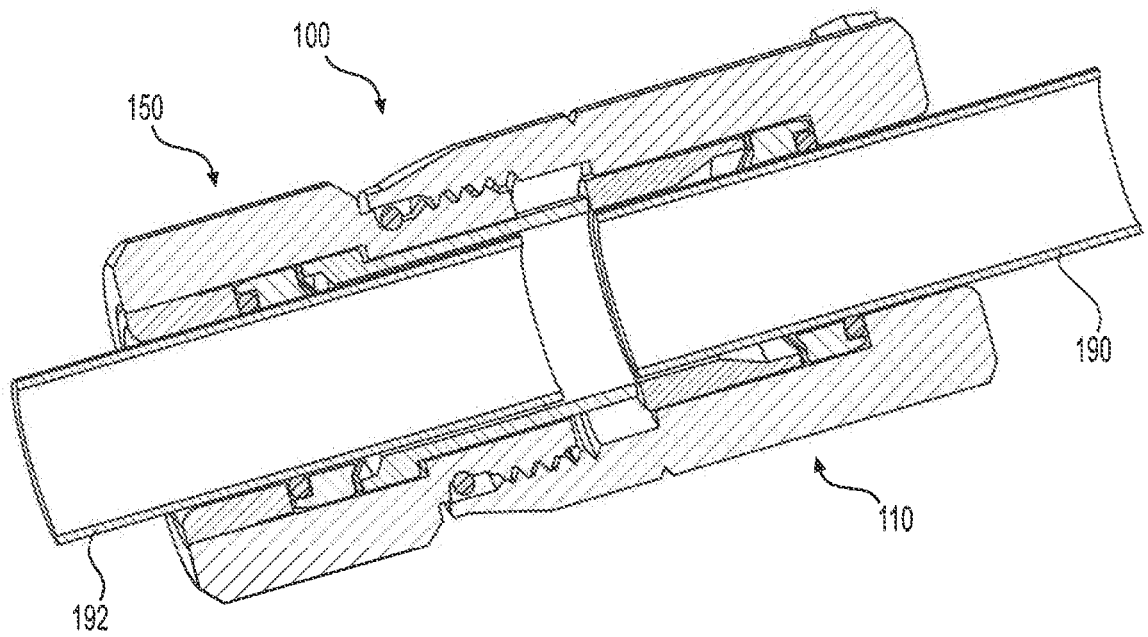
FIG. 7 is a perspective view of the exemplary connector of FIG. 1 in an installed state.

A second hollowed-out hardline conduit 192 may then be inserted into the second connector body 152, as shown in FIGS. 6 and 7. The outer dimension of the second conduit 192 is sized slightly smaller than an inner dimension of the third ring member 153 so as to avoid an interference fit relationship. The second connector body 152 may then be threadably connected with the first connector body 112. For example, the first and second connector portions 110, 150 may be coupled to one another via the female threaded portion 128 of the first connector body 112 that receives the male threaded portion 168 of the second connector body 152. The first and second connector bodies 112, 152 may include hexagonal outer surfaces to facilitate tightening of the coupling between the first and second connector bodies 112, 152. As described in detail above, the second connector body 152 is free to spin (with the third ring member 153) relative to the conduit 192, as well as relative to the fourth ring member 154, the second washer 158, and the pusher 160, as the second connector body 152 is tightened to the first connector body 152.

As the second connector body 152 is rotated to approach a predetermined degree of tightness, for example, a fully tightened position, relative to the first connector body 112, an end face 167 of the pusher 160 engages an end face 127 of the second ring member 120 (FIG. 7). Continued rotation of the second connector body 152 relative to the first connector body 112 to the predetermined degree of tightness, for example, a fully tightened position, urges the pusher 160 toward the third ring member 153, which is fixed relative to the second connector body 152 by their interference fit relationship. Consequently, the pusher 160 sandwiches the fourth ring member 156, the second washer 158, and the second seal 154 against the third ring member 153 to provide an axial press fit relationship among those elements along the longitudinal dimension, thereby ensuring a grounded connection between the first and second conduits 190, 192 by way of the connector 100.

Also, when the first and second connector portions 110, 150 are coupled to one another to a predetermined degree of tightness, for example, a fully tightened position, the third seal 155 is sandwiched between the head 159 of the second connector body 152 and a longitudinal flange 113 (FIG. 5) of the first connector body 112 to provide a weatherproof seal between the first and second connector bodies 112, 152. Meanwhile, upon installation, the first seal 114 cooperates with an outer surface of the aluminum shield 190 to provide a weatherproof seal, and the second seal 154 cooperates with an outer surface of the tubular member 192 to provide a weatherproof seal.

Fiber optic cable can then be injected through the first run of cable, through the connector 100 at the splice location, and through the second run of cable. The first connector body 112 may include a ground screw 194 used to connect a ground path to the connector 100 at the splice location.

As described above, a stamped retention washer may be assembled inside a connector in a loose state in the manufacturing process. This washer being loose allows for the connector to be installed on the cable while allowing the connector nut (outer body) to be rotated independently of the washer, thus preventing the sharp grabbing teeth of the washer from cutting into the cable and creating a weak spot or worse, cutting through the cable. During the connector tightening process in the field application, the components are moved into a compressed state where electrical continuity is restored through the entire connector.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A connector, comprising:
   a first connector body configured to receive a cable;
   a second connector body configured to be coupled to the first connector body; and
   a spacer structure disposed in the second connector body, the spacer structure being configured to permit a tubular member to be pushed in a first direction through the second connector body and into the first connector body while resisting movement of the tubular member in a second direction opposite to the first direction;
   wherein the second connector body is configured to rotate relative to the spacer structure and the tubular member until the second connector body and the first connector body are coupled together to a predetermined degree of tightness; and
   wherein the second connector body is rotatingly fixed with the spacer structure and the tubular member when the second connector body and the first connector body are coupled together to at least the predetermined degree of tightness.

2. The connector of claim 1, wherein the spacer structure is disposed in the second connector between annular member and a cylindrical member in an axial direction of the second connector.

3. The connector of claim 1, wherein the spacer structure comprises a washer.

4. A connector, comprising:
   a first body configured to receive a cable;
   a second body configured to be coupled to the first body; and
   a spacer structure disposed in the second body between an annular member and a cylindrical member in an axial direction of the second body, the spacer structure being configured to permit a tubular member to be pushed in a first direction through the second body and into the first body while resisting movement of the tubular member in a second direction opposite to the first direction;
   wherein the second body is configured to rotate relative to the spacer structure and the tubular member until the second body and the first body are coupled together to a predetermined degree of tightness.

5. The connector of claim 4, wherein the second body includes a cavity; and
   wherein the spacer structure is disposed in the cavity in a floating, non-fixed manner.

6. The connector of claim 4, wherein the spacer structure includes an annular portion and a plurality of fingers extending radially inward from the annular portion; and
   wherein the plurality of fingers are configured to engagingly receive the tubular member.

7. The connector of claim 4, wherein the annular member is configured to be fixedly coupled with the second body; and
   wherein the cylindrical member is configured to be movable in the second body.

8. The connector of claim 4, wherein the cylindrical member is configured to extend out of the second body in the axial direction and into the first connector.

9. The connector of claim 8, wherein the cylindrical member is configured to engage a surface of the first body as the second body is rotated relative to the first body to approach the predetermined degree of tightness.

10. The connector of claim 9, wherein the cylindrical member is configured to be urged in the first direction toward the annular member as the second body is further rotated relative to the first body to the predetermined degree of tightness.

11. The connector of claim 10, wherein the cylindrical member is configured to sandwich the spacer structure with the annular member at the predetermined degree of tightness.

12. The connector of claim 4, wherein the second body is rotatingly fixed with the spacer structure and the tubular member when the second body and the first body are coupled together to at least the predetermined degree of tightness.

13. The connector of claim 4, wherein the spacer structure comprises a washer.

14. A connector, comprising:
   a first portion configured to receive a first conduit;
   a second portion configured to be coupled to the first portion; and
   a spacer structure disposed in the second portion between an annular member and a cylindrical member in an axial direction of the second portion, the spacer structure being configured to permit a second conduit to be pushed in a first direction through the second portion and into the first portion while resisting movement of the second conduit in a second direction opposite to the first direction;
   wherein the second portion is configured to rotate relative to the spacer structure and the second conduit until the second portion and the first portion are coupled together to a predetermined degree of tightness.

15. The connector of claim 14, wherein the spacer structure is configured to be disposed in the second portion in a floating, non-fixed manner.

16. The connector of claim 14, wherein the spacer structure includes an annular portion and a plurality of fingers extending radially inward from the annular portion; and
   wherein the plurality of fingers are configured to engagingly receive the second conduit.

17. The connector of claim 14, wherein the second portion includes a body;
   wherein the annular member is configured to be fixedly coupled with the body; and
   wherein the cylindrical member is configured to be movable in the body.

18. The connector of claim 14, wherein the cylindrical member is configured to extend out of the body in the axial direction and into the first portion.

19. The connector of claim 18, wherein the cylindrical member is configured to engage a surface of the first portion as the second portion is rotated relative to the first portion to approach the predetermined degree of tightness.

20. The connector of claim 19, wherein the cylindrical member is configured to be urged in the first direction toward the annular member as the second portion is further rotated relative to the first portion to the predetermined degree of tightness.

21. The connector of claim 20, wherein the cylindrical member is configured to sandwich the spacer structure with the annular member at the predetermined degree of tightness.

22. The connector of claim 14, wherein the second portion is rotatingly fixed with the spacer structure and the tubular member when the second portion and the first portion are coupled together to at least the predetermined degree of tightness.

23. The connector of claim 14, wherein the spacer structure comprises a washer.

* * * * *